United States Patent
Hirano et al.

(10) Patent No.: US 7,146,508 B2
(45) Date of Patent: Dec. 5, 2006

(54) IMAGE PROCESSING APPARATUS AND SYSTEM AND METHOD OF SAME

(75) Inventors: Tetsuya Hirano, Kanagawa (JP); Hiroshi Tajima, Kanagawa (JP)

(73) Assignee: Sony Corporation (JP)

( * ) Notice: Subject to any disclaimer, the term of this patent is extended or adjusted under 35 U.S.C. 154(b) by 822 days.

(21) Appl. No.: 10/228,310

(22) Filed: Aug. 27, 2002

(65) Prior Publication Data
US 2003/0044010 A1    Mar. 6, 2003

(30) Foreign Application Priority Data
Aug. 28, 2001    (JP)    ............................ P2001-258122

(51) Int. Cl.
*G06F 12/14*    (2006.01)
*H04N 7/167*    (2006.01)

(52) U.S. Cl. ...................... 713/193; 380/200; 380/201; 380/202; 380/203; 380/227; 380/228; 380/229; 380/230

(58) Field of Classification Search ................ 713/193; 380/201–203, 223–230
See application file for complete search history.

(56) References Cited

U.S. PATENT DOCUMENTS

| | | | | |
|---|---|---|---|---|
| 5,883,958 A | * | 3/1999 | Ishiguro et al. ............... 705/57 |
| 5,963,909 A | * | 10/1999 | Warren et al. .................. 705/1 |
| 6,128,605 A | * | 10/2000 | Saito et al. .................... 705/57 |
| 6,266,626 B1 | * | 7/2001 | Yusa et al. ................... 702/117 |
| 6,789,197 B1 | * | 9/2004 | Saito ........................... 713/193 |
| 6,839,090 B1 | * | 1/2005 | Yokota ........................ 348/460 |
| RE38,739 E | * | 5/2005 | Miura .......................... 380/243 |
| 2002/0016962 A1 | * | 2/2002 | DeCarmo ...................... 725/28 |
| 2003/0023847 A1 | * | 1/2003 | Ishibashi et al. ............. 713/169 |

* cited by examiner

Primary Examiner—Nasser Moazzami
Assistant Examiner—Fikremariam Yalew
(74) Attorney, Agent, or Firm—Rader, Fishman, & Grauer PLLC; Ronald P. Kananen (57) ABSTRACT

An image processing apparatus capable of preventing a copy protect function of a video or other contents signal from being disabled. An encoder encodes a contents signal from a DVD reproduction unit. A copy protect circuit performs copy protect processing on the encoded signal and outputs it. The copy protect circuit is controlled by control data input from CPU via an I2C_IF circuit. At this time, verification data from the CPU is stored in, and then read from registers in the I2C_IF circuit. Then, the CPU verifies the destination of transmission of the control data.

2 Claims, 6 Drawing Sheets

IMAGE PROCESSING APPARATUS AND SYSTEM AND METHOD OF SAME

BACKGROUND OF THE INVENTION

1. Field of the Invention

The present invention is related to an image processing apparatus capable of preventing unauthorized disabling of the copy protect function of video and other contents signals and a system and a method of the same.

2. Description of the Related Art

Players for video contents signals of video home system (VHS) tapes, digital versatile disks (DVD), etc. are equipped with a copy protect function preventing the output contents signals from being normally recorded by interfering with the operation of automatic gain control (AGC) circuits.

Figure 5:
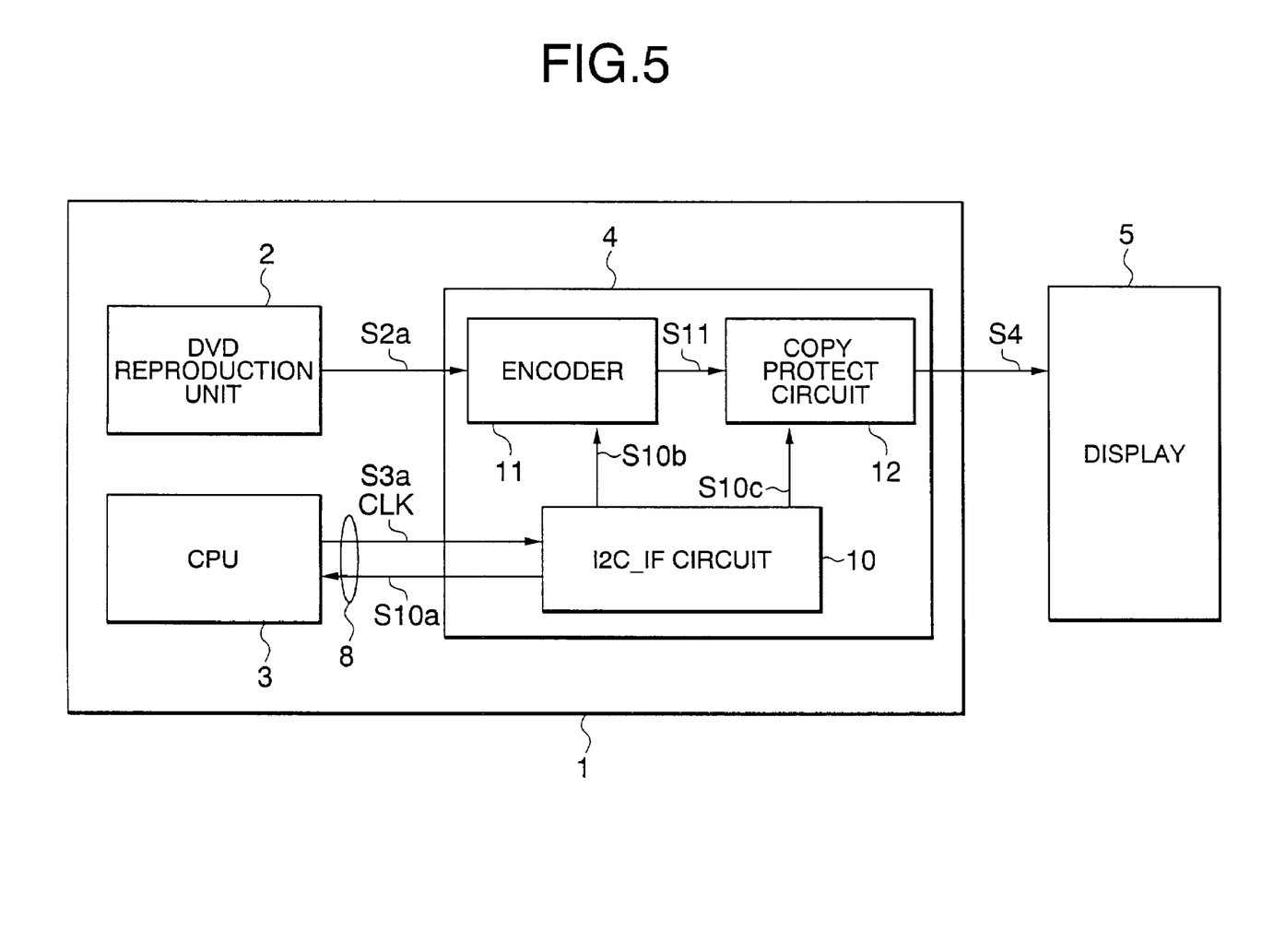
FIG. 5 is a view of the overall configuration of a DVD system of a related art.

FIG. 5 is a view for explaining a DVD system 1 of a related art of the present invention.

As shown in FIG. 5, the DVD system 1 comprises a DVD reproduction unit 2, a central processing unit (CPU) 3, and an image processing unit 4.

The DVD reproduction unit 2 outputs a contents signal S2a obtained by playing a DVD to the image processing unit 4.

The CPU 3, for example, is connected to the image processing unit 4 via an I2C (Inter Integrated Circuit) bus 8, outputs a clock signal CLK as critical data S3a to the image processing unit 4, and transfers data with the image processing unit 4.

The image processing unit 4, as shown in FIG. 5, comprises an I2C_IF circuit 10, an encoder 11, and a copy protect circuit 12.

The I2C_IF circuit 10 outputs control data S10b obtained based on control data S3a input from the CPU 3 to the encoder 11 at a timing based on the clock signal CLK input from the CPU 3 via the I2C bus 8 and also outputs control data 10c to the copy protect circuit 12.

The encoder 11 encodes the contents signal S2a input from the DVD reproduction unit 2 based on the control data S10b input from the I2C_IF circuit 10 and outputs a contents signal S11 obtained by the encoding to the copy protect circuit 12.

The copy protect circuit 12 performs copy protect processing on the contents signal S11 based on the control signal S10c from the I2C_IF circuit 10 and outputs a contents signal S4 obtained by the copy protect processing to a display 5.

At this time, in the copy protection processing, the copy protect circuit 12, for example, inserts a pulse signal randomly changing in amplitude in a vertical blanking period of the contents signal S11 to produce the contents signal S4.

Due to this, when attempting to input the contents signal S4 to a video recorder to make an unauthorized copy, the pulse signal inserted in the contents signal S11 will cause the AGC circuit in the video recorder to malfunction and cause flickering of the reproduced screen, horizontal distortion, and other pronounced degradation of an image when playing back the copied contents signal.

Figure 6:
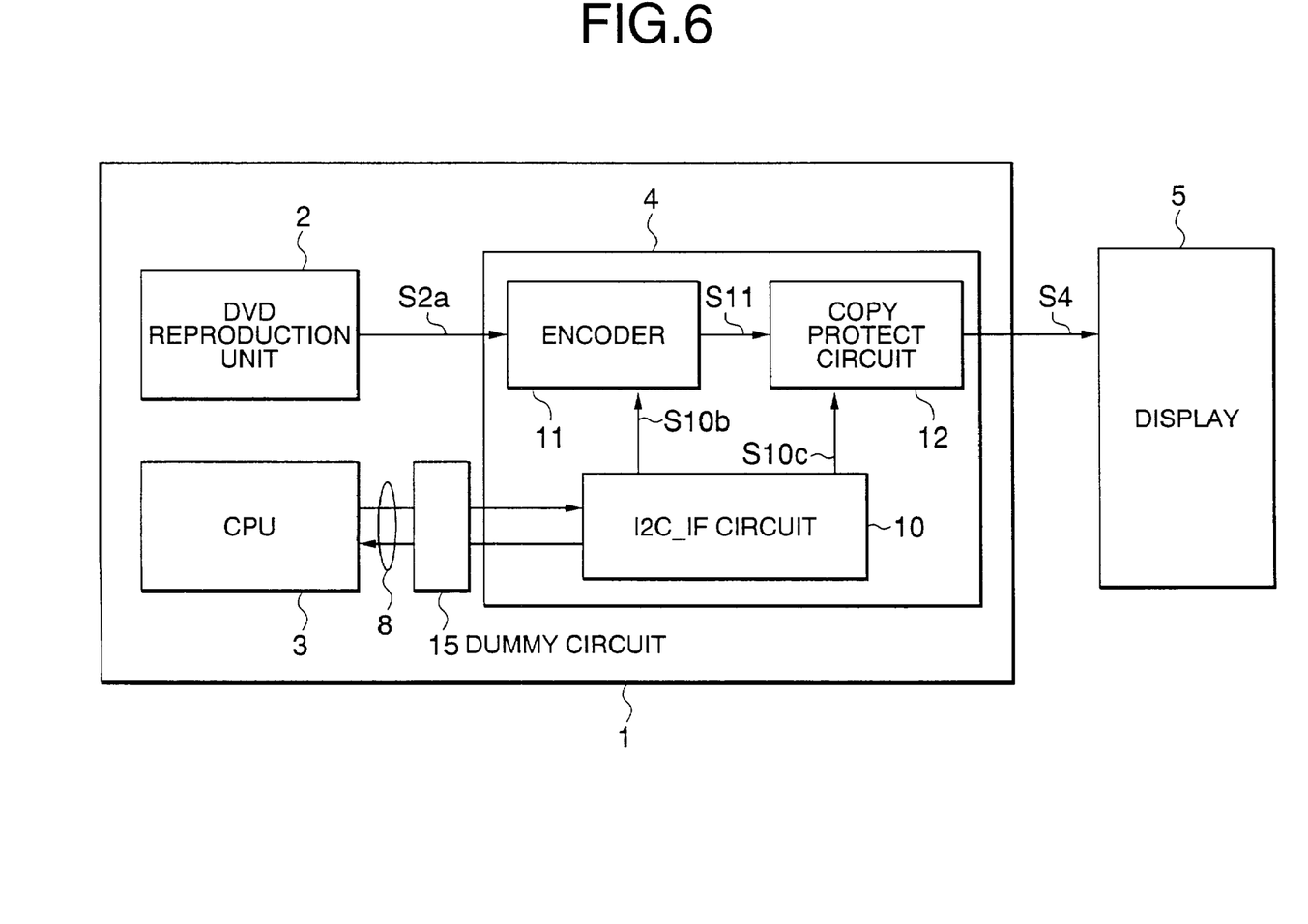
FIG. 6 is a view for explaining a case where a dummy circuit is illicitly inserted in the DVD system shown in FIG. 5.

Further, as shown in FIG. 6, in order to prevent a dummy circuit 15 from being illicitly inserted between the CPU 3 and the image processing unit 4, the control data S3a output from the CPU 3 to the I2C bus 8 from being intercepted, and the I2C_IF circuit 10 from being illicitly modified for the purpose of invalidating the copy protect function of the copy protect circuit 12, the DVD system 1 is equipped with a function verifying a destination of an output of the control data S2a by the CPU 3.

Specifically, the CPU 3 reads identification data ID of the I2C_IF circuit 10 stored in a predetermined read register RR[n] in the I2C_IF circuit 10 via the I2C bus 8 at a predetermined timing and verifies this to confirm that the destination of output of the control signal S2a is the legitimate I2C_IF circuit 10, that is, that a dummy circuit 15 is not inserted.

In the conventional DVD system 1 described above, however, the identification data ID transmitted from the I2C_IF circuit 10 to the CPU 3 is the same every time; therefore, it is easy to intercept the identification data ID by the dummy circuit 15 shown in FIG. 6 and thereby fabricate a dummy circuit 15 having the function of transmitting the predetermined identification data ID in response to an inquiry from the CPU 3.

Due to this, there is the disadvantage that the control data S2a is liable to be illicitly analyzed by using such a fabricated dummy circuit 15.

SUMMARY OF THE INVENTION

An object of the present invention is to provide an image processing apparatus capable of preventing a copy protect function of a video or other contents signal from being illicitly disabled and a system and a method of the same.

According to a first aspect of the invention, there is provided an image processing apparatus for processing a contents signal, comprising: an encoder for encoding the contents signal on the basis of first control data; a copy protect circuit for performing copy protect processing on the encoded contents signal on the basis of second control data before outputting the encoded contents signal; and an interface circuit for outputting the first control data and the second control data obtained from control data input from a control apparatus outside of the image processing apparatus to the encoder and the copy protect circuit respectively; wherein the interface circuit receives as input verification data used for verifying legitimacy of a destination of an output of the control data by the control apparatus and outputs the verification data to the control apparatus.

According to a second aspect of the invention, there is provided an image processing apparatus for processing a contents signal, comprising: an encoder for encoding the contents signal on the basis of first control data; a copy protect circuit for performing copy protect processing on the encoded contents signal on the basis of second control data before outputting the encoded contents signal; and an interface circuit for outputting the first control data and the second control data obtained from control data input from a control apparatus outside of the image processing apparatus to the encoder and the copy protect circuit respectively, wherein the interface circuit receives as input first verification data used for verifying the legitimacy of a destination of an output of the control data by the control apparatus, performs predetermined processing using the first verification data to produce second verification data, and outputs the second verification data to the control apparatus.

According to a third aspect of the invention, there is provided an image processing system, comprising: a player for reproducing a contents signal; an image processing apparatus for processing the reproduced contents signal; and a control apparatus for controlling the image processing apparatus; the image processing apparatus comprising: an encoder for encoding the contents signal on the basis of first control data; a copy protect circuit for performing copy protect processing on the encoded contents signal on the basis of second control data before outputting the encoded contents signal; and an interface circuit for outputting the first control data and the second control data obtained from control data input from a control apparatus outside of the image processing apparatus to the encoder and the copy protect circuit respectively; wherein the interface circuit inputs verification data used for verifying the legitimacy of a destination of the output of the control data by the control apparatus and outputs the verification data to the control apparatus.

According to a fourth aspect of the invention, there is provided an image processing system, comprising: a player for reproducing a contents signal; an image processing apparatus for processing the reproduced contents signal and a control apparatus for controlling the image processing apparatus; the image processing apparatus comprising: an encoder for encoding the contents signal on the basis of first control data; a copy protect circuit for performing copy protect processing on the encoded contents signal on the basis of second control data before outputting the encoded contents signal; and an interface circuit for outputting the first control data and the second control data obtained from control data input from a control apparatus outside of the image processing apparatus to the encoder and the copy protect circuit respectively; wherein the interface circuit receives as input first verification data used for verifying legitimacy of a destination of output of the control data by the control apparatus, performs predetermined processing using the first verification data to produce second verification data, and outputs the second verification data to the control apparatus.

According to a fifth aspect of the invention, there is provided an image processing method performed by an image processing system, comprising: a player, a control apparatus and an image processing apparatus, said image processing method, comprising the steps of reproducing by the player a contents signal; outputting by the control apparatus a control signal to the image processing apparatus; encoding by the image processing apparatus the reproduced contents signal based on the control data; performing copy protect processing by the image processing apparatus on the encoded contents signal based on the control data before outputting the encoded contents signal; outputting by the control apparatus verification data used for verifying the legitimacy of a destination of the control data to the image processing apparatus; outputting by the image processing apparatus the verification data input from the control apparatus to the control apparatus; judging by the control apparatus the legitimacy of the destination of outputting the control data based on the verification data input from the image processing apparatus; and determining by the control apparatus whether or not to continue to output the control data to the image processing apparatus based on the judgment.

According to a sixth aspect of the invention, there is provided an image processing method performed by an image processing system, comprising: a player, a control apparatus and an image processing apparatus, said image processing method comprising the steps of reproducing by the player a contents signal; outputting by the control apparatus a control signal to the image processing apparatus; encoding by the image processing apparatus the reproduced contents signal based on the control data; performing copy protect processing by the image processing apparatus on the encoded contents signal based on the control data before outputting the encoded contents signal; outputting by the control apparatus first verification data to the image processing apparatus; performing predetermined processing by the image processing apparatus using the first verification data input from the control apparatus to produce second verification data; outputting by the image processing apparatus the second verification data to the control apparatus; judging by the control apparatus the legitimacy of the destination of outputting the control data based on the second verification data input from the image processing apparatus; and determining by the control apparatus whether or not to continue to output the control data to the image processing apparatus based on the judgment.

BRIEF DESCRIPTION OF THE DRAWINGS

These and other object and features of the present invention will become clearer from the following description of the preferred embodiments given with reference to the attached drawings, in which.

DESCRIPTION OF THE PREFERRED EMBODIMENTS

Below, DVD systems 101 of embodiments of the present invention will be explained.

First Embodiment

Figure 1:
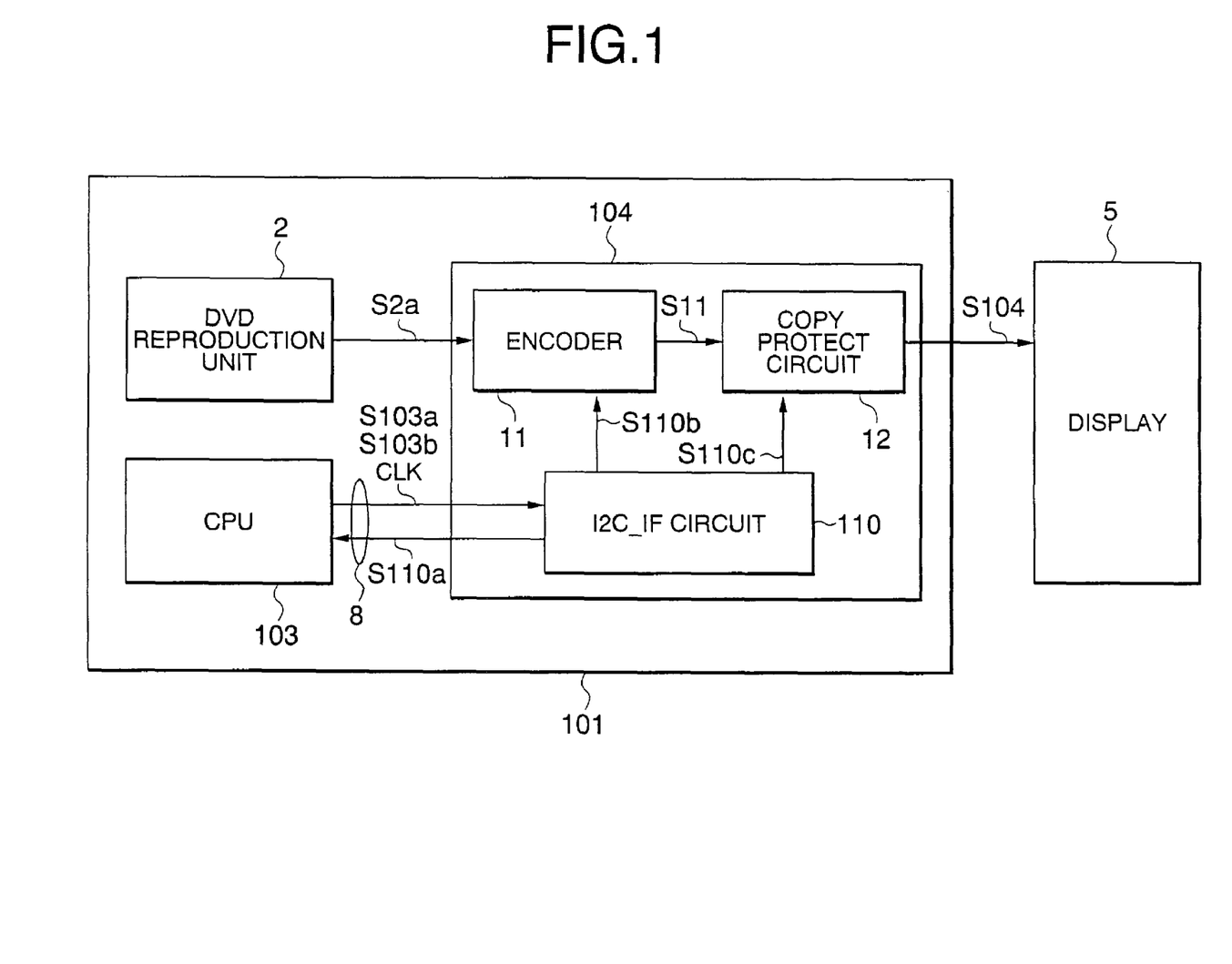
FIG. 1 is a view of the overall configuration of a DVD system of a first embodiment of the present invention.

FIG. 1 is a view of the overall configuration of a DVD system 101.

As shown in FIG. 1, the DVD system 101 comprises a DVD reproduction unit 2, a CPU 103, and an image processing unit 104.

The DVD system 101 corresponds to the player of the present invention, the CPU 3 corresponds to the control apparatus of the present invention, and the image processing unit 104 corresponds to the image processing apparatus of the present invention.

The DVD reproduction unit 2 plays a DVD to produce a video or other contents signal S2$a$ and outputs it to the image processing unit 104.

For example, the CPU 103 is connected with the I2C_IF circuit 110 of the image processing unit 104 via a I2C bus 8.

The I2C bus 8 is a serial bus for transferring data between devices by a signal line SCL (Serial Clock) and a signal line SDA (Serial Data).

At this time, the CPU 103 serves as a master and the I2C_IF circuit 110 as a slave.

The CPU 103 outputs the clock signal CLK to the image processing unit 104 via the signal line SCL.

Further, the CPU 103 transfers data with the image processing unit 104 via the signal line SDA.

Specifically, the CPU 103 outputs the control data S103a to the I2C_IF circuit 110 via the signal line SDA.

Further, the CPU 103 outputs verification use data S103b to the I2C_IF circuit 110 of the image processing unit 104 via the I2C bus 8 at a predetermined timing and receives as input verification use data S110a from the I2C_IF circuit 110 via the I2C bus 8.

Then, the CPU 103 compares the output verification use data S103b and the input verification data S110a, decides the destination of the output of the control data S103a is the proper I2C_IF circuit 110 and continues to output the control data S103a when the result of the comparison indicates coincidence, and stops outputting the control data S103a when the result does not indicate coincidence.

In the present embodiment, different data is used as the verification data S103b transmitted from the CPU 103 to the I2C_IF circuit 110 every time the verification use data S103b is transmitted in units of a predetermined number of transmissions.

As shown in FIG. 1, the image processing unit 104 comprises, for example, an I2C_IF circuit 110, an encoder 11, and a copy protect circuit 12.

The I2C_IF circuit 110 operates at a timing based on the clock signal CLK input from the CPU 3 via the I2C bus 8.

Further, the I2C_IF circuit 110 outputs control data S110b obtained based on the control data S103a input from the CPU 103 and also outputs control data S110c obtained based on the control data S103a to the copy protect circuit 12.

Figure 2:
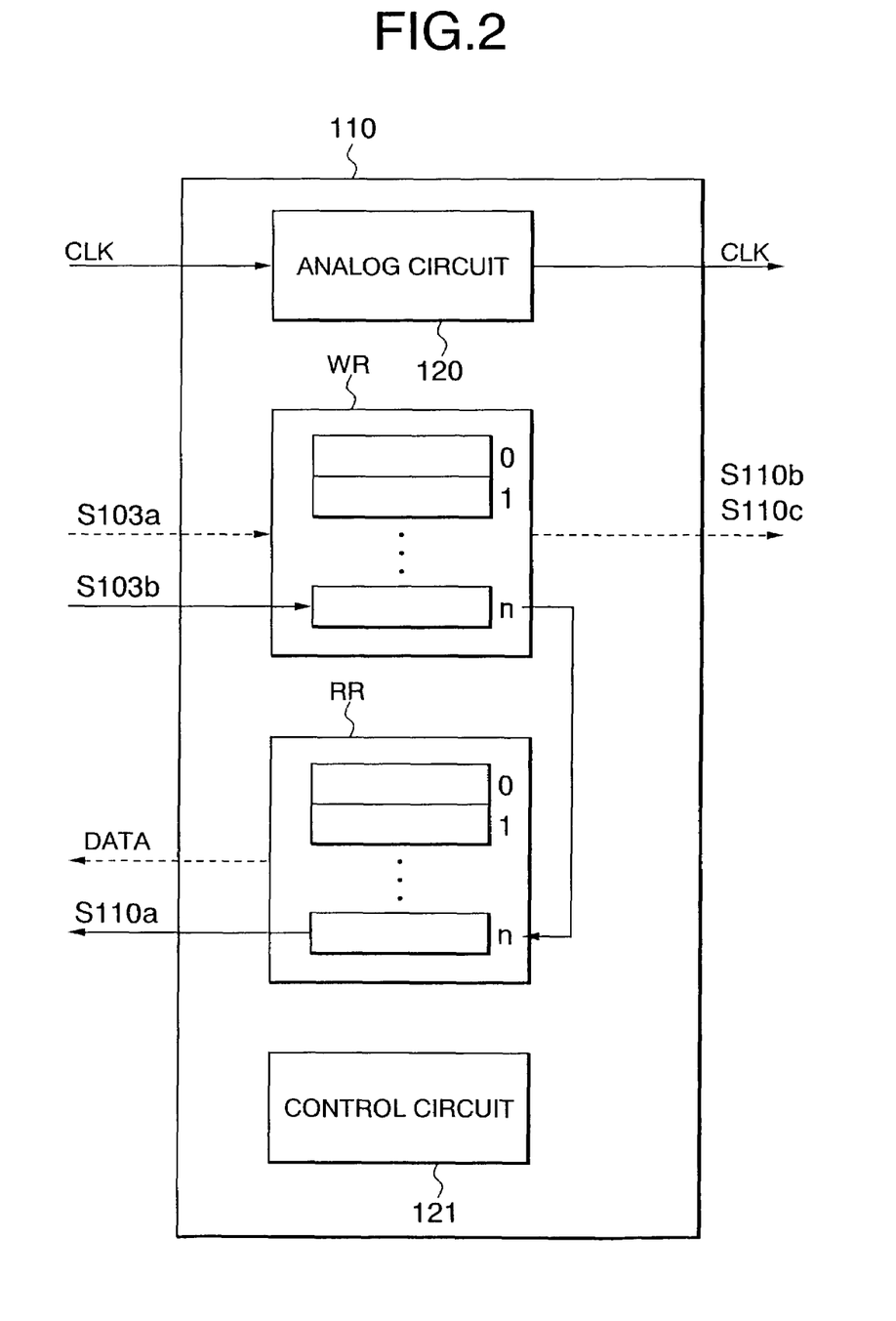
FIG. 2 is a functional block diagram of an I2C_IF circuit shown in FIG. 1.

FIG. 2 is a function block diagram of the I2C_IF circuit 110.

As shown in FIG. 2, the I2C_IF 110 comprises, for example, an analog circuit 120, a write register WR, a read register RR, and a control circuit 121.

The analog circuit 120 performs predetermined analog processing on the clock signal CLK input from the CPU 103 and supplies the result to the write register WR, the read register RR, the control circuit 121, and if necessary the encoder 11 and the copy protect circuit 12.

The write register WR comprises, for example, (n+1) number of registers indicated by "0" to "n".

Here, the write registers WR "0" to "n−1" are used for storing the control data S103a.

Further, the write register WR "n" is used for storing the verification data S103b.

The read register RR comprises, for example, (n+1) number of registers indicated by "0" to "n".

Here, the read register RR "0" to "n−1" are used for storing data obtained by the processing of the I2C_IF circuit 110 and data input from the encoder 11 and the copy protect circuit 12, if necessary.

Further, the read register RR "n" is used for storing the verification data read from the write register WR "n".

The control circuit 121, for example, reads the verification data from the read register RR "n" and outputs this to the CPU 103 as the verification data S110a under control of the CPU 103.

Note that, the read register RR "n" may be directly accessed for reading from the CPU 103.

The encoder 11 encodes the contents signal S2a input from the DVD reproduction unit 2 based on the control data S110b input from the I2C_IF circuit 110 and outputs a contents signal S11 obtained by the encoding to the copy protect circuit 12.

The copy protect circuit 12 performs copy protect processing on the contents signal S11 based on the control signal S110c from the I2C_IF circuit 110 and then outputs a contents signal S104 obtained by the copy protect processing to a display 5.

At this time, the copy-protect circuit 12, for example, inserts a pulse signal having a randomly changing amplitude in a vertical blanking period of the contents signal S11 to produce the contents signal S104 by the copy protect operation.

Due to this, when attempting to input the contents signal S104 to a video recorder to make an unauthorized copy, the pulse signal inserted in the contents signal S11 will cause the AGC circuit in the video recorder to malfunction and will cause flickering of the reproduced screen, horizontal distortion, and other pronounced degradation of an image when playing back the copied contents signal.

Below, an example of the operation of the DVD system 101 shown in FIG. 1 will be explained.

First Example of Operation

In the present example of operation of the DVD system 101, as shown in FIG. 1, an example of operation when the CPU 103 is directly connected with the I2C_IF circuit 110 via the I2C bus 8 will be explained.

The CPU 103 transmits the control data S103a to the I2C_IF circuit 110 via the I2C bus 8.

The I2C_IF circuit 110 stores the control data S103a to, for example, the write register WR shown in FIG. 2, reads the control data S103a as the control data S110b from the write register WR and outputs the same to the encoder 11, reads the control data S103a as the control data S110b from the write register WR and outputs the same to the encoder 11, and then reads the control data S103a as the control data S110c from the write register WR and outputs the same to the copy protect circuit 12.

The encoder 11 then encodes the contents signal S2a to produce the contents signal S11 based on the control data S110b and outputs the contents signal S11 to the copy protect circuit 12.

Then, the copy protect circuit 12 performs copy protection processing on the contents signal S11 to produce the contents signal S104 and outputs the same to the display 5.

Due to this, the properly copy protected contents signal S104 is output to the outside of the DVD system 101.

In the process of the processing described above, the CPU 103 outputs the verification data S103b to the I2C_IF circuit 110 via the I2C bus 8 at a predetermined timing.

The I2C_IF circuit 110 stores the verification data S103b in the write register WR "n".

Then, for example, the control circuit 121 writes the verification data read from the write register WR "n" to the read register RR "n".

Then, the verification data S110a read from the read register RR is output to the CPU 103 via the I2C bus 8.

Then, the CPU 103 judges that the output verification data S103b and the input verification data S110a coincide and then continues to output the control data S103a to the I2C_IF circuit 110.

Note that, in the present embodiment, different data is used as the verification data S103b transmitted from the CPU 103 to the I2C_IF circuit 110 with every transmission or in units of a predetermined number of transmissions.

Second Example of Operation

Figure 3:
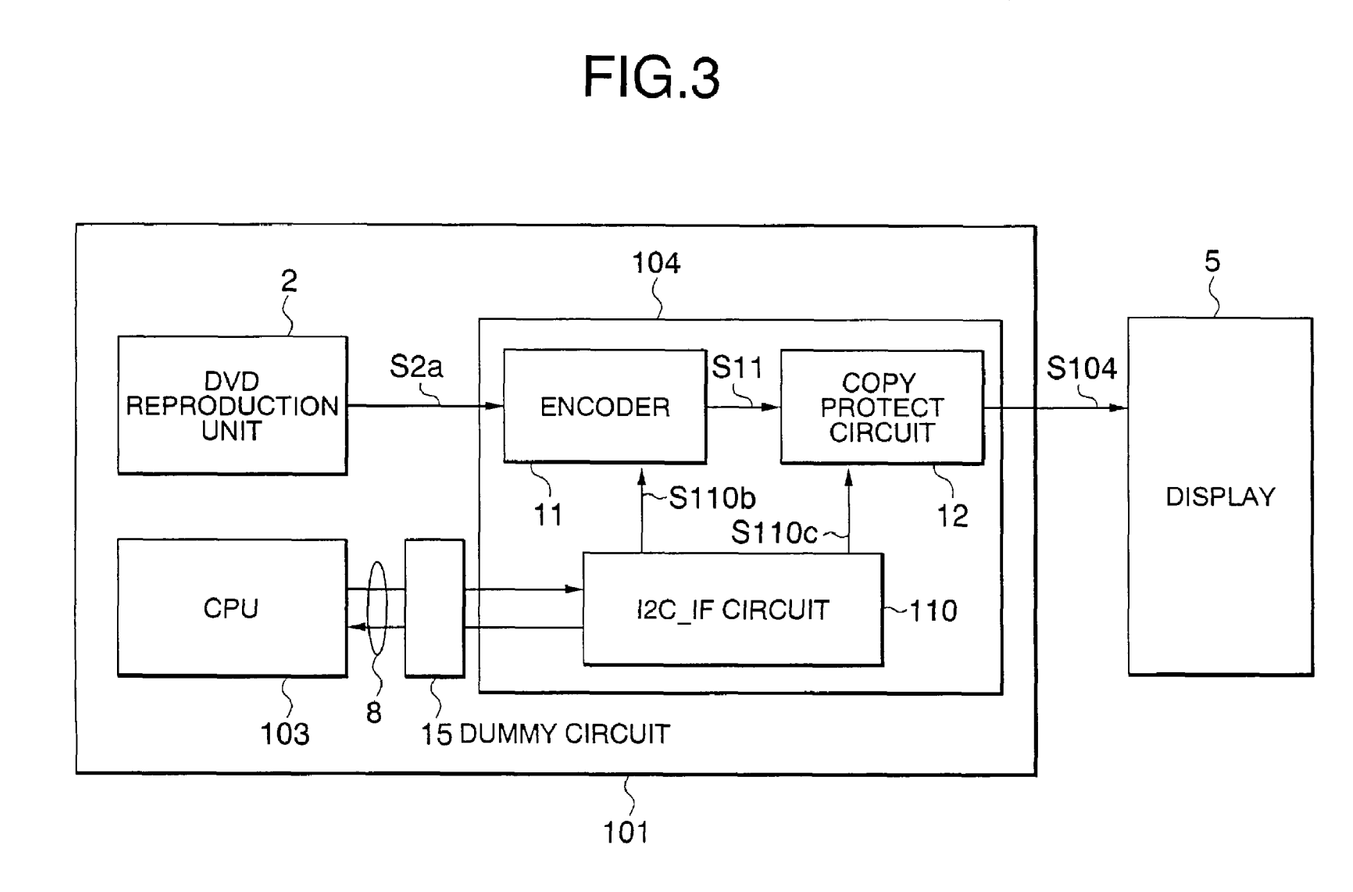
FIG. 3 is a view for explaining a case where a dummy circuit is illicitly inserted in the DVD system shown in FIG. 1.

In the present example of operation of the DVD system 101, as shown in FIG. 3, an example of operation when a dummy circuit 15 is illicitly inserted between the CPU 103 and I2C_IF circuit 110 will be explained.

The CPU 103 transmits the verification data S103b via the I2C bus 8, and then the dummy circuit 15 receives the verification data S103b.

In this case, the dummy circuit 15, for example, transmits the received verification data S103b to the CPU 103 or returns the same data with the received verification data S103b. Therefore, the CPU 103 decides that the verification data S103b and the verification data S110a do not coincide, and then stops transmitting the control data S103a to the I2C bus 8.

Due to this, it is possible to prevent the dummy circuit 15 from illicitly monitoring the control data S103a.

Second Embodiment

The DVD system of the present embodiment is the same as that of the DVD system 101 shown in FIG. 1, except for the processing of the verification of the CPU 103 and the configuration of the I2C_IF circuit 110.

Figure 4:
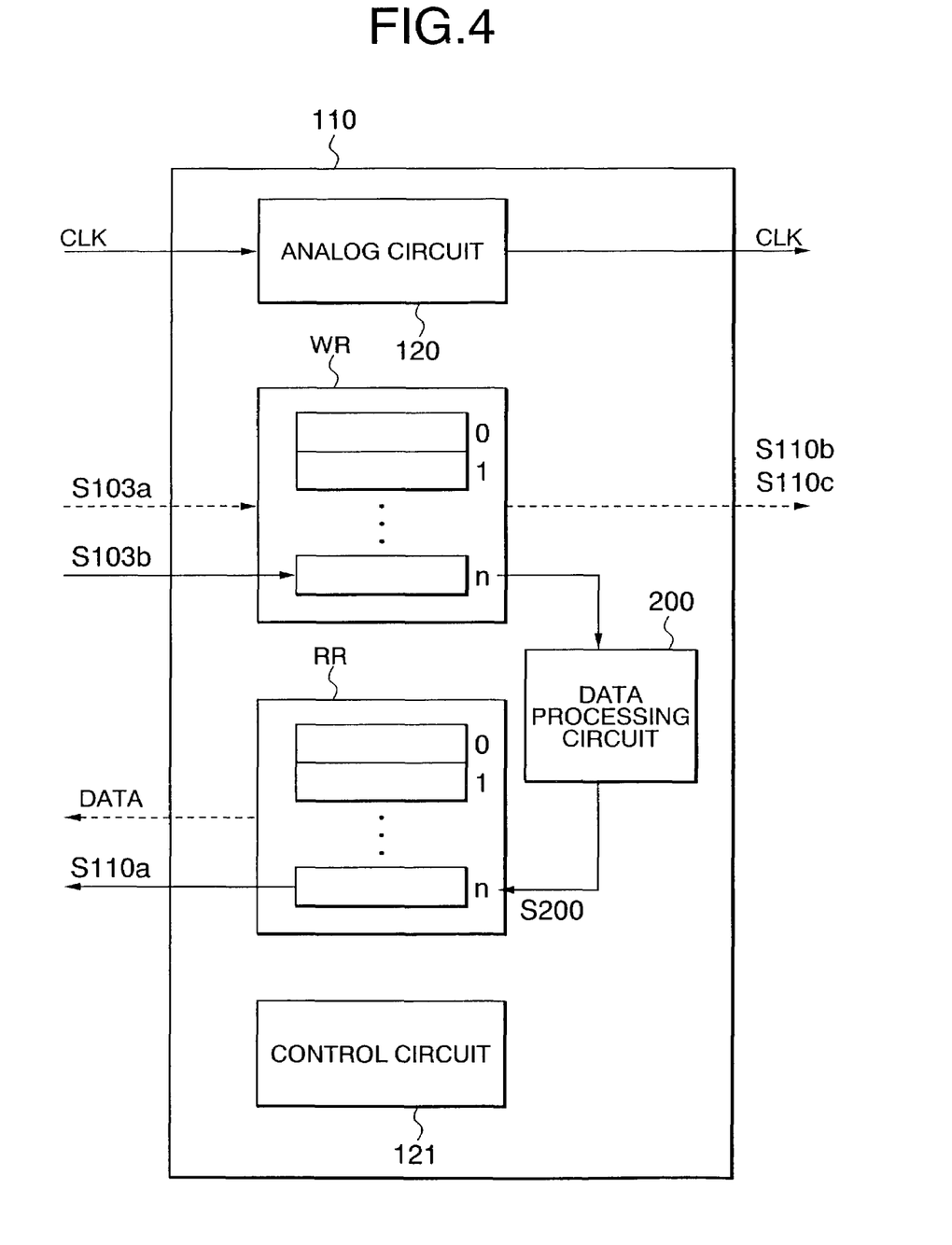
FIG. 4 is a view for explaining an I2C_IF circuit of a DVD system of a second embodiment of the present invention.

As shown in FIG. 4, an I2C_IF circuit 110 of the present embodiment has the configuration of the I2C_IF circuit 110 shown in FIG. 2 plus a data processing circuit 200.

In FIG. 4, an analog circuit 120, a write register WR, a read register RR, and a control circuit 121 are basically the same as those explained in the first embodiment.

In the I2C_IF circuit 110 of the present embodiment, the data processing circuit 200 performs data processing using verification data read from the write register WR "n" and writes new verification data S200 obtained by the data processing to the read register RR "n".

Then, verification data S110a (S200) read from the read register RR "n" is output to the CPU 103.

The CPU 103 performs, for example, processing reverse to that of the data processing circuit 200 on the verification data S103b obtained from the verification data S110a (S200) and verifies whether or not this and output verification data S103b coincide.

Further, the CPU 103 may compare the data obtained by performing the same processing as that of the data processing circuit 200 with respect to the verification data S103b in advance and the input verification data S110a input from the I2C_IF circuit 110.

Further, the data processing circuit 200 may encrypt verification data read from the write register WR "n" by using predetermined encryption key data, while CPU 103 may decrypt the verification data S110a using decryption key data corresponding to the encryption key data to perform verification.

As described above, according to the DVD system of the present embodiment, the contents of processing of the data processing circuit and the key data are kept secret; therefore, the CPU 103 can properly verify the origin of transmission of the control data S103a.

The present invention is not limited to the embodiments described above.

For example, in the above embodiments, a video contents signal was illustrated as an example of the contents signal, but the present invention may also be applied to an audio contents signal.

Summarizing the effects of the invention, as described above, according to the present invention, a processing apparatus capable of preventing a copy-protect function of video and other contents signals from being illicitly disabled and a system and method of the same can be provided.

What is claimed is:

1. An image processing apparatus for processing a video signal, comprising:

an encoder for encoding said video signal on the basis of first control data;

a copy protect circuit for performing copy protect processing on the encoded video signal on the basis of second control data before outputting the encoded video signal; and an interface circuit for outputting said first control data and said second control data obtained from control data input from a control apparatus outside of said image processing apparatus to said encoder and said copy protect circuit respectively; wherein said interface circuit comprises a first storage circuit for storing a first verification data that is received from the control apparatus, said first verification data being made different by the control apparatus every time a predetermined number of transmissions of the first verification data is made by the control apparatus, a data processing circuit for performing predetermined processing on said first verification data to produce second verification data, said predetermined processing including an encryption of said first verification data using a predetermined encryption key to produce said second verification data, and a second storage circuit for storing second verification data, for transmission of said second verification data to said control apparatus to accommodate continued receipt of the control data from the control apparatus.

2. An image processing system, comprising:

a player for reproducing a video signal;

an image processing apparatus for processing the reproduced video signal; and a control apparatus for controlling said image processing apparatus;

said image processing apparatus comprising:

an encoder for encoding said video signal on the basis of a first control data;

a copy protect circuit for performing copy protect processing on the encoded video signal on the basis of second control data before outputting the encoded video signal; and an interface circuit for outputting said first control data and said second control data obtained from control data input from a control apparatus outside of said image processing apparatus to said encoder and said copy protect circuit respectively; wherein said interface circuit comprises a first storage circuit for storing a first verification data that is received from the control apparatus, said first verification data being made different by the control apparatus every time a predetermined number of transmissions of the first verification data is made by the control apparatus, a data processing circuit for performing predetermined processing on said first verification data to produce second verification data, said predetermined processing including an encryption of said first verification data using a predetermined encryption key to produce said second verification data, and a second storage circuit for storing second verification data, for transmission of said second verification data to said control apparatus to accommodate continued receipt of the control data from the control apparatus.

* * * * *